(12) United States Patent
Murray et al.

(10) Patent No.: US 8,378,891 B2
(45) Date of Patent: Feb. 19, 2013

(54) METHOD AND SYSTEM FOR OPTIMIZING QUALITY AND INTEGRITY OF LOCATION DATABASE ELEMENTS

(75) Inventors: Dave Murray, Mission Viejo, CA (US); Charles Abraham, Los Gatos, CA (US); Mark Buer, Gilbert, AZ (US); David Garrett, Tustin, CA (US); Jeyhan Karaoguz, Irvine, CA (US); David Lundgren, Mill Valley, CA (US)

(73) Assignee: Broadcom Corporation, Irvine, CA (US)

( * ) Notice: Subject to any disclaimer, the term of this patent is extended or adjusted under 35 U.S.C. 154(b) by 107 days.

(21) Appl. No.: 12/732,913

(22) Filed: Mar. 26, 2010

(65) Prior Publication Data

US 2011/0199255 A1 Aug. 18, 2011

Related U.S. Application Data

(60) Provisional application No. 61/304,168, filed on Feb. 12, 2010.

(51) Int. Cl.
*G01S 3/02* (2006.01)
(52) U.S. Cl. ...................................................... 342/450
(58) Field of Classification Search .................. 342/450, 342/357.71, 357.65
See application file for complete search history.

(56) References Cited

U.S. PATENT DOCUMENTS

| | | | | |
|---|---|---|---|---|
| 7,102,508 | B2 * | 9/2006 | Edelstein et al. | 340/539.13 |
| 8,040,275 | B2 * | 10/2011 | Ronald et al. | 342/357.29 |
| 2003/0225893 | A1 | 12/2003 | Roese et al. | |
| 2008/0032706 | A1 * | 2/2008 | Sheynblat et al. | 455/456.1 |
| 2009/0316601 | A1 * | 12/2009 | Zhu et al. | 370/254 |
| 2010/0013628 | A1 * | 1/2010 | Monroe | 340/539.18 |
| 2010/0220005 | A1 * | 9/2010 | Kosolobov et al. | 342/357.12 |
| 2010/0256840 | A1 * | 10/2010 | Call et al. | 701/17 |
| 2010/0285827 | A1 * | 11/2010 | Kim et al. | 455/517 |
| 2011/0039515 | A1 * | 2/2011 | Burke | 455/404.2 |
| 2011/0060760 | A1 * | 3/2011 | Ji et al. | 707/770 |
| 2011/0078582 | A1 * | 3/2011 | Christianson et al. | 715/747 |
| 2011/0080317 | A1 * | 4/2011 | Alizadeh-Shabdiz et al. | 342/357.23 |

* cited by examiner

*Primary Examiner* — Harry Liu
(74) *Attorney, Agent, or Firm* — Sterne, Kessler, Goldstein & Fox PLLC

(57) ABSTRACT

A location server may be operable to refine a location for a RF node based on a weight applied to one or more location samples that are received from one or more mobile devices. The received location samples may be weighted based on a manufacturer and/or a model information of each of the mobile devices, properties and/or conditions of a RF environment associated with each of the mobile devices, a GNSS dilution of precision, motion sensors used by each of the mobile devices and/or a geometrical population condition associated with each of the mobile devices within range of the RF node. A valid location for the RF node may be generated utilizing the weighted location samples. The location server may update location information for the RF node, which may be stored in a location database, utilizing the valid location for the RF node.

20 Claims, 4 Drawing Sheets

METHOD AND SYSTEM FOR OPTIMIZING QUALITY AND INTEGRITY OF LOCATION DATABASE ELEMENTS

CROSS-REFERENCE TO RELATED APPLICATIONS/INCORPORATION BY REFERENCE

This patent application makes reference to, claims priority to, and claims benefit from U.S. Provisional Application Ser. No. 61/304,168, which was filed on Feb. 12, 2010.

The above stated application is hereby incorporated herein by reference in its entirety.

FIELD OF THE INVENTION

Certain embodiments of the invention relate to communication systems. More specifically, certain embodiments of the invention relate to a method and system for optimizing quality and integrity of a location database.

BACKGROUND OF THE INVENTION

Location-based services (LBS) are emerging as a new type of value-added service provided by mobile communication network. LBS are mobile services in which the user location information is used in order to enable various LBS applications such as, for example, enhanced 911 (E-911), location-based 411, location-based messaging and/or location-based friend finding services. A location of a mobile device may be determined in different ways such as, for example, using network-based technology, using terminal-based technology, and/or hybrid technology, which is a combination of the former technologies. Many positioning technologies such as, for example, time of arrival (TOA), observed time difference of arrival (OTDOA), enhanced observed time difference (E-OTD) as well as the global navigation satellite system (GNSS) such as GPS, GLONASS, Galileo, Compass, and/or assisted-GNSS (A-GNSS), may be utilized to estimate the location (latitude and longitude) of the mobile device and convert it into a meaningful X, Y coordinate for LBS applications. A-GNSS technology combines satellite positioning and communication networks such as mobile networks to reach performance levels allowing the wide deployment of Location-Based Services.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for optimizing quality and integrity of location database elements, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for optimizing quality and integrity of location database elements. In various embodiments of the invention, a location server may be operable to refine a location for a RF node based on a weight applied to one or more location samples that are communicated from one or more mobile devices. In this regard, the location server may be operable to receive location samples for the RF node from one or more of the mobile devices. The RF node is a RF network device that may comprise, for example, a cell station, a wireless access point (AP) and/or a FM station. The received location samples may be weighted by the location server. A valid location for the RF node may be generated by the location server utilizing the weighted location samples. The location server may then be operable to update location information for the RF node, which may be stored in a location database in the location server as a database element, utilizing the generated valid location for the RF node.

In this regard, for example, the location samples received from each of the mobile devices may be weighted based on a manufacturer and/or a model information of each of the mobile devices. The received location samples may be weighted based on properties and/or conditions of a RF environment that is associated with each of the mobile devices. Exemplary properties and/or conditions of the RF environment may comprise an indoor environment, an outdoor environment, an urban environment, a rural environment, a multipath channel with a power delay profiles (PDP) and/or a velocity of each of the mobile devices. The received location samples may be weighted based on a dilution of precision (DOP) associated with a global navigation satellite system (GNSS), which may be generated by each of the mobile devices. The received location samples may be weighted based on one or more motion sensors which may be used by each of the mobile devices. The received location samples may also be weighted based on a geometrical population condition associated with each of the mobile devices within a range of the RF node.

Figure 1:
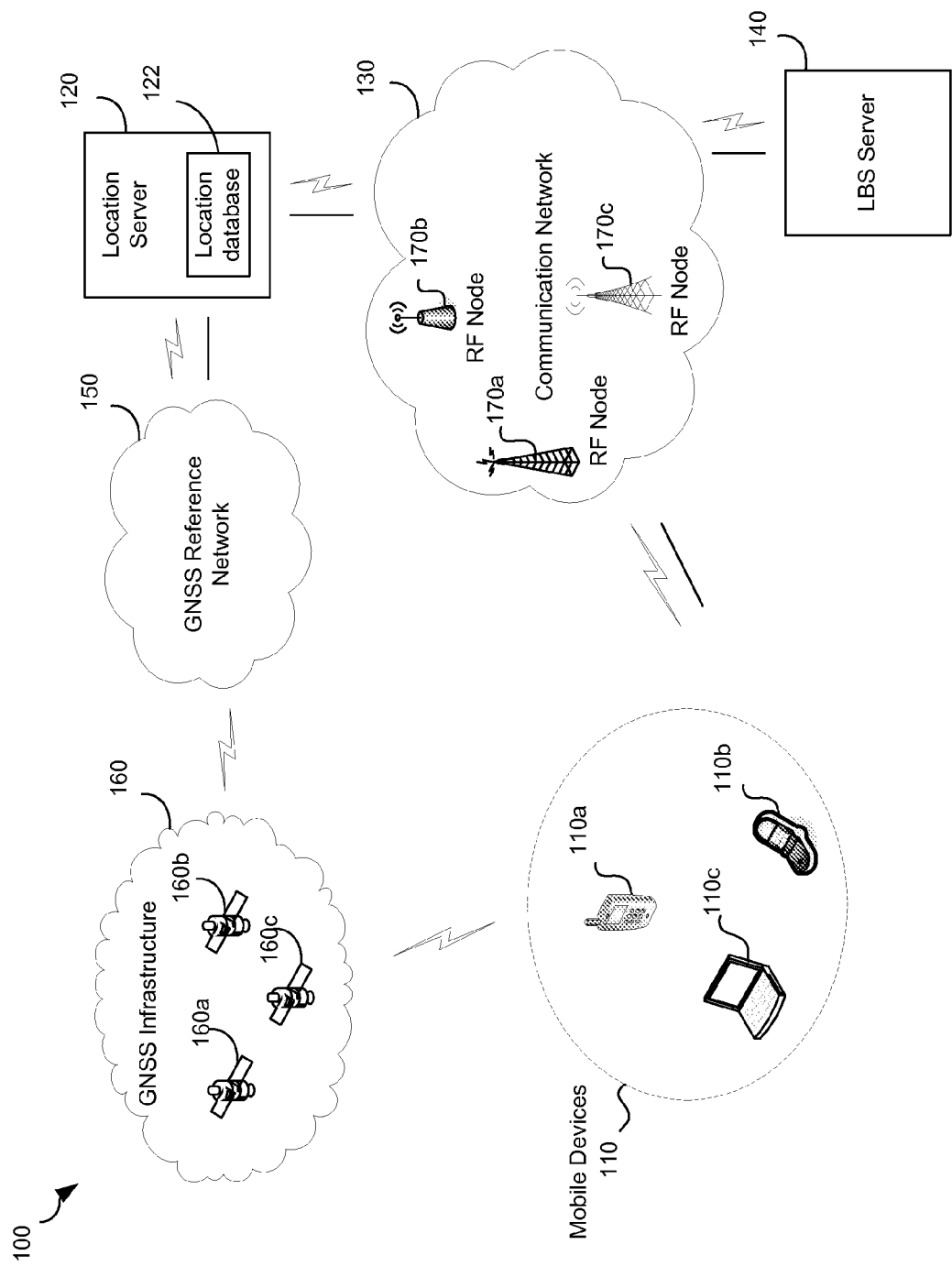
FIG. 1 is a block diagram illustrating an exemplary communication system that is operable to optimize quality and integrity of location database elements in a location server, in accordance with an embodiment of the invention.

FIG. 1 is a block diagram illustrating an exemplary communication system that is operable to optimize quality and integrity of location database elements in a location server, in accordance with an embodiment of the invention. Referring to FIG. 1, there is shown a communication system 100. The communication system 100 comprises a plurality of mobile devices 110, of which mobile devices 110a-110c are illustrated, a location server 120 comprising a location database 122, a communication network 130, a LBS server 140, a GNSS reference network 150 and a GNSS infrastructure 160. The communication network 130 may comprise a plurality of RF nodes, of which RF nodes 170a-170c are illustrated. The GNSS infrastructure 160 may comprise a plurality of GNSS satellites, of which GNSS satellites 160a-160c are illustrated.

Each of the mobile devices 110a-110c such as the mobile device 110a may comprise suitable logic, circuitry, interfaces and/or code that may be operable to communicate radio signals across the communication network 130, for example, via the RF nodes 170a-170c. The mobile device 110a may be operable to receive GNSS broadcast signals from a plurality of visible GNSS satellites such as GNSS satellites 160a-160c in the GNSS infrastructure 160. The mobile devices 110a-110c may provide or report device-assisted location samples for a RF node such as, for example, the RF node 170a to the location server 120. The mobile devices 110a-110c may provide additional information to the location server 120 relating to, for example, manufacturer and/or model information of each of the mobile devices 110a-110c, properties and/or conditions of RF environments that are associated with the mobile devices 110a-110c, GNSS DOPs generated by the mobile devices 110a-110c, one or more motion sensors used by the mobile devices 110a-110c and/or geometrical positions around the RF node 170a that the mobile devices 110a-110c may be located.

The mobile devices 110a-110c, which may be from different manufacturers and/or may have different model information, may possess, for example, different antenna characteristics and orientation profiles. Accordingly, for example, the location sample reported by the mobile device 110a may be more accurate than the location sample reported by the mobile device 110b due to the different qualities of the antennas. More weight may be applied to the location sample reported by the mobile device 110a and less weight may be applied to the location sample reported by the mobile device 110b during the weighting process in the location server 120 for generating a valid location for the RF node 170a.

The properties and/or conditions of the RF environments that are associated with the mobile devices 110a-110c may comprise for example, indoor environments, outdoor environments, urban environments, rural environments, multipath channels with power delay profiles (PDPs) and/or velocities of the mobile devices 110a-110c. The signal strength received by the mobile device 110b may be noticed to be artificial depressed according to a profile or histogram of signal strengths around the RF node 170a, in instances when the mobile device 110b is located indoors or in an urban area where there may be a lot of blockages. Accordingly, the location sample for the RF node 170a provided by the mobile device 110b may not be as accurate as the location sample provided by the mobile device 110a which is located, for example, outdoors or in a rural area. In this regard, for example, more weight may be applied to the location sample reported by the mobile device 110a and less weight may be applied to the location sample reported by the mobile device 110b during the weighting process in the location server 120 for generating a valid location for the RF node 170a.

In another embodiment of the invention, the mobile device 110b may provide a location sample for the RF node 170a while the mobile device 110b is located indoors or in an urban area, and also provide a location sample for the RF node 170a while the mobile device 110b is located outdoors or in a rural area. In this regard, for example, during the weighting process in the location server 120 for generating a valid location for the RF node 170a, more weight may be applied to the location sample, which is provided while the mobile device 110b in located outdoors or in a rural area, and less weight may be applied to the location sample, which is provided while the mobile device 110b is located indoors or in an urban area.

The power delay profile (PDP) is a measurement of interference due to signal reflections. The PDP, which may be measured by the mobile device 110a, shows the intensity of a signal received through a multipath channel of the mobile device 110a as a function of time delay. The PDP measurement may be used to extract certain channel parameters such as a delay spread. The delay spread is the maximum delay after which the received signal becomes negligible. In an exemplary embodiment of the invention, the mobile device 110a, for example, may be operable to determine a reliability indication that is associated with the location sample generated for the RF node 170a based on the PDP of the multipath channel and report that reliability indication along with the location sample to the location server 120. In this regard, more or less weight may be applied to the location sample reported by the mobile device 110a accordingly during the weighting process in the location server 120 for generating a valid location for the RF node 170a.

The velocity of the mobile device 110a in conjunction with a Doppler effect may have effect on the signal strength received by the mobile device 110a. Accordingly, this environmental information may also be utilized by the location server 120 to apply more or less weight to the location sample reported by the mobile device 110a during the weighting process in the location server 120 for generating a valid location for the RF node 170a.

The dilution of precision (DOP) is a value or number which may be generated or computed by the mobile device 110a to specify an additional multiplicative effect of GNSS satellite geometry on GNSS precision. The signal from each GNSS satellite, for example, the GNSS satellite 160a may have a level of precision, depending on the relative geometry of the GNSS satellites 160a-160c. These precisions may be combined to give amplified or greatly compressed precision. In instances when the visible GNSS satellites 160a-160c are close together in the sky, the geometry is said to be weak and the DOP value is high. In instances when the visible GNSS satellites 160a-160c are far apart, the geometry is strong and the DOP value is low. In this regard, a high DOP value may indicate lower GNSS reliability and a low DOP value may indicate higher GNSS reliability. Accordingly, this GNSS reliability indication may be utilized by the location server 120 to apply more or less weight to the location sample reported by the mobile device 110a during the weighting process in the location server 120 for generating a valid location for the RF node 170a.

A mobile device such as the mobile device 110a may comprise one or more motion sensors. For example, the mobile device 110a may comprise an accelerometer, a gyroscope and/or an altimeter. The mobile device 110a may use, for example, one or more of these motion sensors in conjunction with GNSS satellites 160a-160c to provide a location sample for the RF node 170a, utilizing dead reckoning (DR). The dead reckoning (DR) is a process of estimating a current location based upon a previously determined location, and advancing that location based upon known or estimated speeds over elapsed time and course. For example, the mobile device 110a and the mobile device 110b may both enter an area such as indoors or an urban canyon area where the GNSS signals from the GNSS satellites 160a-160c may become unavailable or unreliable due to multipath. The mobile device 110a may use one or more of the motion sensors to provide a more accurate location sample, utilizing dead reckoning (DR). In this instance, for example, the location sample reported by the mobile device 110a may be weighted higher by the location server 120. The location sample reported by the mobile 110b, which does not use a motion sensor and the dead reckoning (DR), may be weighted lower by the location server 120.

The area within a range around the RF node 170a may be geometrically divided into small areas such as, for example, small square or rectangular areas. In an exemplary embodiment of the invention, the mobile device 110a may be located in a geometrically heavily populated area within the range of the RF node 170a such as, for example, on a highway. In this instance, a large number of location samples for the RF node 170a may be reported by a large number of mobile devices 110a-110c to the location server 120. The mobile device 110a may also be located in a geometrically lightly populated area within the range of the RF node 170a such as, for example, in a residential area. In this instance, only a small number of location samples for the RF node 170a may be reported by a small number of mobile devices 110a-110c. In this regard, for example, based on the geometrical position of the mobile device 110a within the range of the RF node 170a, the location sample reported by the mobile device 110a may be weighted lower by the location server 120 in instances when the mobile device 110a is located in a geometrically heavily populated area. The location sample reported by the mobile device 110a may be weighted higher by the location server 120 in instances when the mobile device 110a is located in a geometrically lightly populated area. Accordingly, during the weighting process in the location server 120 for generating a valid location for the RF node 170a, location samples for the RF node 170a contributed from multiple resources geometrically may be balanced out by the location server 120 so that no one resource dominates within the range of the RF node 170a geometrically.

The location server 120 may comprise suitable logic, circuitry, interfaces and/or code that may be operable to access the GNSS reference network 150 to collect GNSS satellite data by tracking GNSS constellations through the GNSS reference network 150. The location server 120 may be operable to utilize the collected GNSS satellite data to generate GNSS assistance data (A-GNSS data) comprising, for example, ephemeris data, LTO data, reference positions and/or time information. The location server 120 may be operable to collect and/or retrieve location information from associated users such as the RF nodes 170a-170c and/or the mobile devices 110a-110c. For example, the location server 120 may be operable to retrieve and/or track location information of the RF node 170a from the mobile devices 110a-110c. The retrieved location of the RF node 170a may be refined and stored in the location database 122 so that it may be shared among associated mobile devices 110a-110c such as the mobile device 110a. The location server 120 may be operable to communicate the stored location of the RF node 170a as A-GNSS data to the mobile device 110a, when need.

The location server 120 may be operable to refine location samples for the RF node 170a received from the mobile devices 110a-110c based on weights applied to the location samples. For example, the location samples received from the mobile devices 110a-110c may be weighted based on manufacturer and/or model information of each of the mobile devices 110a-110c. The received location samples may be weighted based on properties and/or conditions of RF environments associated with the mobile devices 110a-110c such as, for example, indoor environments, outdoor environments, urban environments, rural environments, multipath channels with PDPs and/or velocities of the mobile devices 110a-110c. The received location samples may be weighted based on GNSS DOPs which may be generated by the mobile devices 110a-110c. The received location samples may be weighted based on one or more motion sensors which may be used by the mobile devices 110a-110c. The received location samples may also be weighted based on geometrical population conditions associated with the mobile devices 110a-110c within a range around the RF node 170a so that no one resource around the RF node 170a dominates geometrically. A valid location for the RF node 170a may be generated or calculated by the location server 120 utilizing the weighted location samples. For example, the valid location for the RF node 170a may be calculated by averaging the weighted location samples. The location server 120 may then be operable to update location information for the RF node 170a, which may be stored in the location database 122 in the location server 120 as a database element, utilizing the generated valid location for the RF node 170a.

In an exemplary embodiment of the invention, the location information for the RF node 170a may be confirmed by more than one samples collected at a single position in different time. In this regard, the RF node 170a may be determined as a stationary reference device such as a fixed access point (AP) rather than a mobile reference device such as an AP enabled mobile device 110c. In instances when the RF node 170a is determined as a stationary reference device, the location information for the RF node 170a may be entered into the location database 122 as a valid database element.

The communication network 130 may comprise suitable logic, circuitry, interfaces and/or code that may be operable to provide voice and data services to mobile devices such as the mobile devices 110a-110c by using wireless and/or wired communication technologies such as, for example, WCDMA, UMTS, HSDPA, CDMA, EV-DO, GSM, GPRS, EDGE, EGPRS, LTE, Bluetooth, WiMAX, WiFi, FM, mobile TV and Ethernet. The communication network 130 may be operable to provide communication among the location server 120, the LBS server 140 and a plurality of served mobile devices such as the mobile devices 110a-110c. The communication network 130 may comprise a plurality of RF nodes such as, for example, the RF nodes 170a-170c. The RF node, for example, the RF node 170a is a RF network device that may comprise a cell station, a wireless access point (AP) and/or a FM station.

The LBS server 140 may comprise suitable logic, circuitry, interfaces and/or code that may be operable to provide location based services (LBS). The LBS server may be operable to retrieve information such as, for example, local hotel addresses or a map of the vicinity of areas of interest. The LBS server 140 may be operable to communicate the retrieved information with various communication devices such as the mobile device 110a based on an associated position or location.

The GNSS reference network 150 may comprise suitable logic, circuitry, interfaces and/or code that may be operable to collect and/or distribute data for GNSS satellites 160a-160c on a continuous basis. The GNSS reference network 150 may comprise a plurality of GNSS reference tracking stations or receivers located around the world to provide A-GNSS coverage all the time in both a home network and/or any visited network. The GNSS reference network 150 may be communicatively coupled to the location server 120. The collected GNSS data or information may be utilized by the location server 120 to enhance LBS performance.

Each of the GNSS satellites 160a-160c such as the satellite 160a may comprise suitable logic, circuitry, interfaces and/or code that may be operable to generate and broadcast satellite navigational information. The broadcast satellite navigation information may be collected by the mobile devices 110a-110c, for example. The broadcast satellite navigational information may be collected by the GNSS reference network 150 to be utilized by the location server 120 to enhance LBS performance. The GNSS satellites 160a-160c may comprise, for example, GPS, GLONASS, Galileo and/or Compass satellites.

In operation, one or more of the mobile devices 110a-110c may be operable to provide or report device-assisted location samples for a RF node such as, for example, the RF node 170a to the location server 120. The mobile devices 110a-110c may provide additional information to the location server 120 relating to, for example, manufacturer and/or model information of each of the mobile devices 110a-110c, properties and/or conditions of RF environments that are associated with the mobile devices 110a-110c, GNSS DOPs generated by the mobile devices 110a-110c, one or more motion sensors used by the mobile devices 110a-110c and/or geometrical positions around the RF node 170a that the mobile devices 110a-110c may be located. The location server 120 may be operable to refine the received location samples based on weights applied to the location samples. The location samples received from the mobile devices 110a-110c may be weighted based on manufacturer and/or model information of each of the mobile devices 110a-110c. The received location samples may be weighted based on properties and/or condition of the RF environments that each of the mobile devices 110a-110c encounters. Exemplary properties and/or conditions of the RF environments comprise indoor environments, outdoor environments, urban environments, rural environments, multipath channels with PDPs and/or velocities of the mobile devices 110a-110c. The received location samples may be weighted based on GNSS DOPs which may be generated by the mobile devices 110a-110c. The received location samples may be weighted based on one or more motion sensors which may be used by the mobile devices 110a-110c. The received location samples may also be weighted based on geometrical population conditions associated with the mobile devices 110a-110c with the range of the RF node 170a so that no one resource around the RF node 170a dominates geometrically. A valid location for the RF node 170a may be generated or calculated by the location server 120 utilizing the weighted location samples. The location server 120 may then be operable to update the location information for the RF node 170a, which may be stored in the location database 122 as a database element, utilizing the generated valid location for the RF node 170a.

The location information for the RF node 170a may be confirmed by a plurality of samples collected at a single position in different time to determine that the RF node 170a is a stationary reference device rather than a mobile reference device. In instances when the RF node 170a is determined as a stationary reference device, the location information for the RF node 170a may be entered into the location database 122 as a valid database element.

Figure 2:
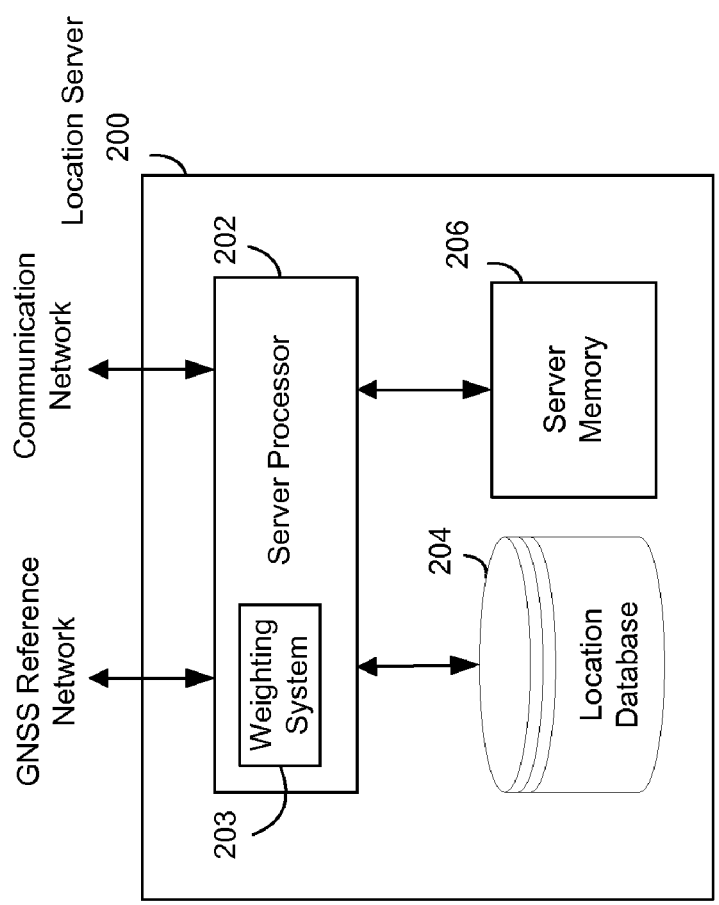
FIG. 2 is a block diagram illustrating an exemplary location server that is operable to optimize quality and integrity of location database elements, in accordance with an embodiment of the invention.

FIG. 2 is a block diagram illustrating an exemplary location server that is operable to optimize quality and integrity of location database elements, in accordance with an embodiment of the invention. Referring to FIG. 2, there is shown a location server 200. The location server 200 may comprise a server processor 202, a location database 204 and a server memory 206. The server processor 202 may comprise a weighting system 203.

The server processor 202 may comprise suitable logic, circuitry, interfaces and/or code that may be operable to manage and/or control operations of the location database 204 and/or the server memory 206. The server processor 202 may be operable to communicate with the GNSS reference network 150 so as to collect GNSS satellite data by tracking GNSS constellations through the GNSS reference network 150. The server processor 202 may utilize the collected GNSS satellite data to build the location database 204, which may be coupled internally or externally to the location server 200. The server processor 202 may be operable to retrieve or collect location information from associated users such as the mobile devices 110a-110c. The collected location information may be refined and stored in the location database 204 to share among associated users. For example, the server processor 202 may be operable to communicate at least a portion of the stored location information with, for example, the mobile device 110a as a needed basis or periodically.

In an exemplary embodiment of the invention, the server processor 202 may be operable to refine a location for a RF node 170a based on weights applied to location samples for the RF node 170a received from one or more of the mobile devices 110a-110c. The weighting system 203 is used to apply weighting to the received location samples for generating a valid location for the RF node 170a. For example, the location samples received from the mobile devices 110a-110c may be weighted based on a manufacturer and/or a model identification number of each of the mobile devices 110a-110c. The received location samples may be weighted based on properties and/or conditions of a RF environment that each of the mobile devices 110a-110c encounters such as, for example, an indoor environment, an outdoor environment, an urban environment, a rural environment, a multipath channel with a PDP and/or a velocity of each of the mobile devices 110a-110c. The received location samples may be weighted based on a GNSS DOP which may be generated by each of the mobile devices 110a-110c. The received location samples may be weighted based on one or more motion sensors which may be used by each of the mobile devices 110a-110c. The received location samples may also be weighted based on a geometrical population condition associated with each of the mobile devices 110a-110c within a range of the RF node 170a so that no one resource around the RF node 170a dominates geometrically. A valid location for the RF node 170a may be generated or calculated by the server processor 202 utilizing the weighted location samples. For example, the valid location for the RF node 170a may be calculated by averaging the weighted location samples. The server processor 202 may then be operable to update location information for the RF node 170a, which may be stored in the location database 204, utilizing the generated valid location for the RF node 170a.

The location database 204 may comprise suitable logic, circuitry, interfaces and/or code that may be operable to store, as a database element, location information of associated reference devices such as, for example, the RF nodes 170a-170c. The stored location information may be provided to associated communication devices such as the mobile device 110a to support LBS applications such as location-based access control. In an exemplary embodiment of the invention, the location information for the RF nodes 170a-170c, which may be stored in the location database 204 as database elements, may be refined utilizing the location samples received from the mobile devices 110a-110c for RF nodes 170a-170c and the weighting system 203.

The server memory 206 may comprise suitable logic, circuitry, interfaces and/or code that may be operable to store information such as executable instructions and data that may be utilized by the server processor 202 and/or other associated component units such as, for example, the location database 204. The server memory 206 may comprise RAM, ROM, low latency nonvolatile memory such as flash memory and/or other suitable electronic data storage.

In operation, the server processor 202 may be operable to refine a location for a RF node 170a based on weights applied to location samples for the RF node 170a received from one or more of the mobile devices 110a-110c. The weighting system 203 is used to apply weighting to the received location samples for generating a valid location for the RF node 170a. The location samples received from the mobile devices 110a-110c may be weighted based on a manufacturer and/or a model identification number of each of the mobile devices 110a-110c. The received location samples may be weighted based on properties and/or conditions of a RF environment that each of the mobile devices 110a-110c encounters such as, for example, an indoor environment, an outdoor environment, an urban environment, a rural environment, a multipath channel with a PDP and/or a velocity of each of the mobile devices 110a-110c. The received location samples may be weighted based on a GNSS DOP which may be generated by each of the mobile devices 110a-110c. The received location samples may be weighted based on one or more motion sensors which may be used by each of the mobile devices 110a-110c. The received location samples may also be weighted based on a geometrical population condition associated with each of the mobile devices 110a-110c within a range of the RF node 170a so that no one resource around the RF node 170a dominates geometrically. A valid location for the RF node 170a may be generated or calculated by the server processor 202 utilizing the weighted location samples. The server processor 202 may then be operable to update location information for the RF node 170a, which may be stored in the location database 204, utilizing the generated valid location for the RF node 170a.

Figure 3:
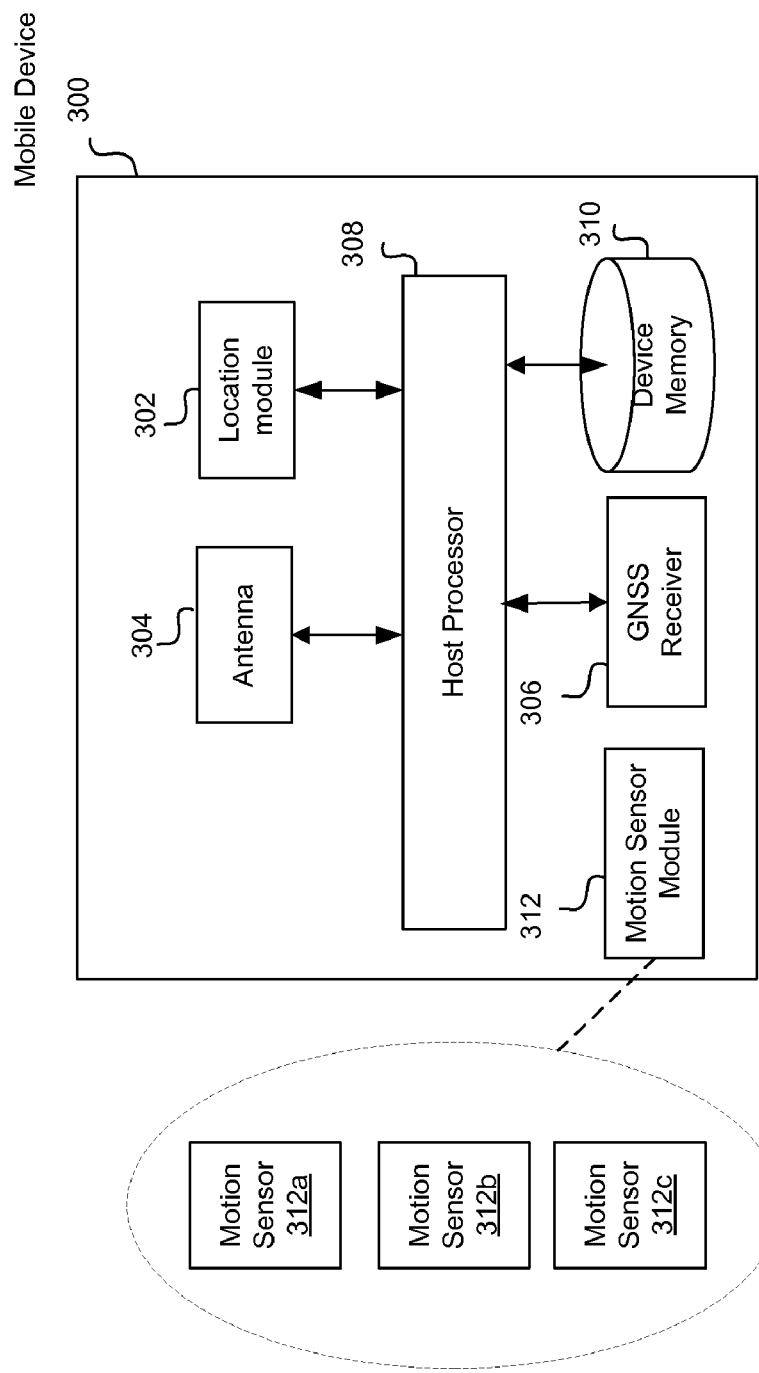
FIG. 3 is a block diagram illustrating an exemplary mobile device that is operable to optimize quality and integrity of location database elements in a location server, in accordance with an embodiment of the invention.

FIG. 3 is a block diagram illustrating an exemplary mobile device that is operable to optimize quality and integrity of location database elements in a location server, in accordance with an embodiment of the invention. Referring to FIG. 3, there is shown a mobile device 300. The mobile device 300 may comprise a location module 302, an antenna 304, a host processor 308, a GNSS receiver 306, a device memory 310 and a motion sensor module 312.

The location module 302 may comprise suitable logic, circuitry, interfaces and/or code that may be operable to provide or report device-assisted location samples for a RF node such as, for example, the RF node 170a to the location server 120. The location module 302 may provide additional information to the location server 120 relating to, for example, a manufacturer and/or model identification number of the mobile device 300, properties and/or conditions of a RF environment that the mobile device 300 may encounter, a GNSS DOP generated by the GNSS receiver 306, the use of one or more motion sensors 312a-312c in the motion sensor module 312 and/or a geometrical position of the mobile device 300 within a range of the RF node 170a. The additional information provided by the location module 302 may be utilized by the location server 120 to weight the location samples which may then be in turn utilized by the location server 120 to refine location information for the RF node 170a which may be stored in the location database 122.

The motion sensor module 312 may comprise suitable logic, circuitry, interfaces and/or code that may be operable to sense various motions or movements of the mobile device 300. The motion sensor module 312 may comprise one or more motion sensors 312a-312c such as, for example, an accelerometer, a gyroscope and/or an altimeter. In an exemplary embodiment of the invention, one or more motion sensors 312a-312c in the motion sensor module 312 may be used by the location module 302 to provide a location sample for a RF node such as the RF node 170a to the location server 120, utilizing dead reckoning (DR).

The antenna 304 may comprise suitable logic, circuitry, interfaces and/or code that may be operable to communicate radio signals over the communication network 130 using various wireless access technologies.

The host processor 308 may comprise suitable logic, circuitry, interfaces and/or code that may be operable to process signals from the antenna 304, the location module 302 and/or the GNSS receiver 306. The host processor 308 may manage and/or control operations of the antenna 304, the location module 302 and/or the GNSS receiver 306. The host processor 308 may be operable to communicate signals with the communication network 130 via the antenna 304. The host processor 308 may be operable to communicate navigation information with the communication network 130 for various location based services such as E-911, location-based 411 and/or location-based messaging.

The GNSS receiver 306 may comprise suitable logic, circuitry, interfaces and/or code that may be operable to detect and receive GNSS signals from a plurality of visible GNSS satellites 160a-160c. The GNSS receiver 306 may be operable to utilize the received GNSS signals to calculate navigation information or solution such as a position fix and/or velocity of the GNSS receiver 306. The calculated navigation information may be provided to the host processor 308 to be communicated with the communication network 130 for various navigation applications such as, for example, location-based 411 and/or roadside assistance. The GNSS receiver 306 may be operable to generate the GNSS DOP and provide the GNSS DOP information to the location module 302.

The device memory 310 may comprise suitable logic, circuitry, interfaces and/or code that may be operable to store information such as executable instructions, data and/or database that may be utilized by the host processor 308 and the location module 302. The device memory 310 may comprise RAM, ROM, low latency nonvolatile memory such as flash memory and/or other suitable electronic data storage.

In operation, the location module 302 may be operable to provide or report device-assisted location samples for the RF node 170a to the location server 120. The location module 302 may provide additional information to the location server 120 relating to, for example, a manufacturer and/or model identification number of the mobile device 300, properties and/or conditions of the RF environment that is associated with the mobile device 300, a GNSS DOP generated by the GNSS receiver 306, the use of one or more motion sensors 312a-312c in the motion sensor module 312 and/or a geometrical position of the mobile device 300 around the RF node 170a. The additional information provided by the location module 302 may be utilized by the location server 120 to weight the location samples which may then be in turn utilized by the location server 120 to refine the location information which may be stored in the location database 122.

Figure 4:
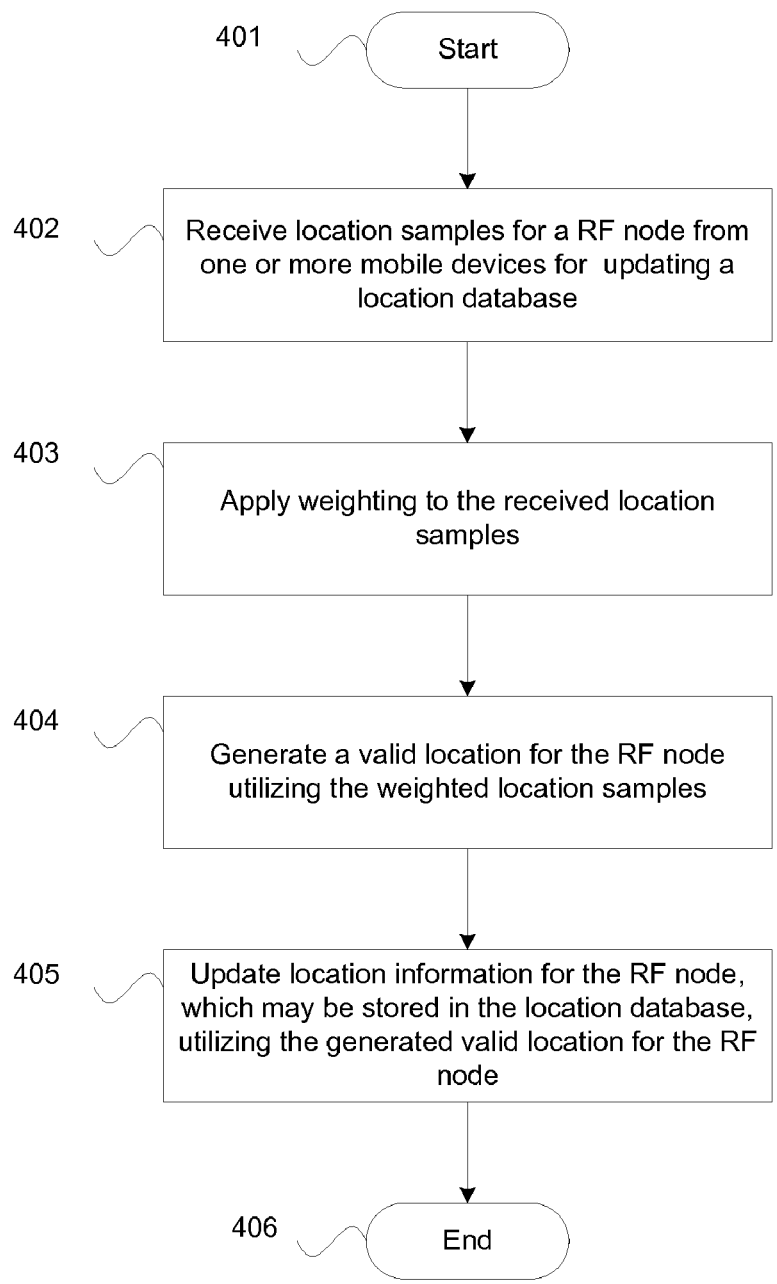
FIG. 4 is a flow chart illustrating exemplary steps for optimizing quality and integrity of location database elements in a location server, in accordance with an embodiment of the invention.

FIG. 4 is a flow chart illustrating exemplary steps for optimizing quality and integrity of location database elements in a location server, in accordance with an embodiment of the invention. Referring to FIG. 4, the exemplary steps start at step 401. In step 402, the location server 120 may be operable to receive location samples for a RF node 170a from one or more mobile devices 110a-110c for updating a location database 122. In step 403, the location server 120 may be operable to apply weighting to the received location samples utilizing a weighting system 203. In step 404, a valid location for the RF node 170a may be generated by the location server 120 utilizing the weighted location samples. In step 405, the location server 120 may be operable to update location information for the RF node 170a, which may be stored in the location database 122, utilizing the generated valid location for the RF node 170a. The exemplary steps may proceed to the end step 406.

In various embodiments of the invention, a location server 120 may be operable to refine a location for a RF node 170a based on a weight applied to one or more location samples that are communicated from one or more mobile devices 110a-110c. In this regard, the location server 120 may be operable to receive location samples for the RF node 170a from one or more of the mobile devices 110a-110c. The RF node 170a is a RF network device that may comprise, for example, a cell station, a wireless access point (AP) and/or a FM station. The received location samples may be weighted by the location server 120. A valid location for the RF node 170a may be generated by the location server 120 utilizing the weighted location samples. The location server 120 may then be operable to update location information for the RF node 170a, which may be stored in a location database 122 in the location server 120 as a database element, utilizing the generated valid location for the RF node 170a.

In this regard, for example, the location samples received from each of the mobile devices 110a-110c may be weighted based on a manufacturer and/or a model identification number of each of the mobile devices 110a-110c. The received location samples may be weighted based on properties and/or conditions of a RF environment that is associated with each of the mobile devices 110a-110c. Exemplary properties and/or conditions of the RF environment may comprise an indoor environment, an outdoor environment, an urban environment, a rural environment, a multipath channel with a power delay profiles (PDP) and/or a velocity of each of the mobile devices 110a-110c. The received location samples may be weighted based on a dilution of precision (DOP) associated with a global navigation satellite system (GNSS), which may be generated by each of the mobile devices 110a-110c. The received location samples may be weighted based on one or more motion sensors 312a-312c which may be used by each of the mobile devices 110a-110c. The received location samples may also be weighted based on a geometrical population condition associated with each of the mobile devices 110a-110c within a range of the RF node 170a.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for optimizing quality and integrity of location database elements.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for determining a location of an RF node, the method comprising:
    performing by one or more processors and/or circuits in a location server:
        receiving a first location for the RF node from a first mobile device;
        receiving a second location for the RF node from a second mobile device, the second mobile device being different from, the first mobile device; and
        calculating a valid location for the RF node based on the first location and the second location.

2. The method according to claim 1, further comprising:
    receiving first additional information from the first mobile device;
    receiving second additional information from the second mobile device; and
    weighting the first location and the second location based on the first additional information and the second additional information,
    wherein the calculating of the valid location for the RF node is based on the weighted first location and the weighted second location.

3. The method according to claim 2, further comprising updating location information of the RF node based on the valid location for said RF node, wherein said location information is stored in a location database in said location server.

4. The method according to claim 2, wherein the first additional information includes at least one of a manufacturer and a model identification information of the first mobile device, and
    wherein the second additional information includes at least one of a manufacturer and a model identification information of the second mobile device.

5. The method according to claim 2, wherein the first additional information and the second additional information each includes at least one property of an RF environment that is associated with the first and second mobile devices.

6. The method according to claim 5, wherein the at least one property of the RF environment includes at least one of an indoor environment, an outdoor environment, an urban environment, a rural environment, a multipath channel with a power delay profile (PDP) a velocity of the first mobile device, and a velocity of the second mobile device.

7. The method according to claim 2, wherein the first additional information includes a dilution of precision (DOP) associated with a global navigation satellite system (GNSS) which is generated by the first mobile device, and wherein the second additional information includes a DOP associated with a GNSS which is generated by the second mobile device.

8. The method according to claim 2, wherein the first additional information includes motion information generated by one or more motion sensors of the first mobile device,
wherein the second additional information includes motion information generated by one or more motion sensors of the second mobile device, and
wherein the one or more motion sensors of the first mobile device and the one or more sensors of the second mobile device each include at least one of an accelerometer, a gyroscope and an altimeter.

9. The method according to claim 2, wherein the first additional information includes a geometrical population condition associated with the first mobile device, and
wherein the second additional information includes a geometrical population condition associated with the second mobile device.

10. The method of claim 2, wherein the first additional information includes a reliability indication calculated by the first mobile device that indicates a reliability of the first location, and
wherein the second additional information includes a reliability indication calculated by the second mobile device that indicates a reliability of the second location.

11. The location server of claim 2,
wherein the calculation of the valid location of the RF node includes an average of the weighted first location and the weighted second location.

12. A location module, comprising:
one or more processors and/or circuits configured to:
receive a first location for the RF node from a first mobile device;
receive a second location for the RF node from a second mobile device, the second mobile device being different from the first mobile device; and
calculate a valid location for the RF node based on the first location and the second location.

13. The location module according to claim 12, wherein said one or more processors and/or circuits are further configured to:
receive first additional information from the first mobile device;
receive second additional information from the second mobile device; and
weight the first location and the second location based on the first additional information and the second additional information,
wherein the calculating of the valid location for the RF node is based on the weighted first location and the weighted second location.

14. The location server according to claim 13, wherein said one or more processors and/or circuits are further configured to update location information of the RF node based on the valid location for said RF node, wherein said location information is stored in a location database in said location server.

15. The location server according to claim 13, wherein the first additional information includes at least one of a manufacturer and a model identification information of the first mobile device, and
wherein the second additional information includes at least one of a manufacturer and a model identification information of the second mobile device.

16. The location server according to claim 13, wherein the first additional information and the second additional information each includes at least one property of an RF environment that is associated with the first and second mobile devices.

17. The location server according to claim 16, wherein the at least one property of the RF environment includes at least one of an indoor environment, an outdoor environment, an urban environment, a rural environment, a multipath channel with a power delay profile (PDP), a velocity of the first mobile device, and a velocity of the second mobile device.

18. The location server according to claim 13, wherein the first additional information includes a dilution of precision (DOP) associated with a global navigation satellite system (GNSS) which is generated by the first mobile device, and
wherein the second additional information includes a DOP associated with a GNSS which is generated by the second mobile device.

19. The location server according to claim 13, wherein the first additional information includes motion information generated by one or more motion sensors of the first mobile device,
wherein the second additional information includes motion information generated by one or more motion sensors of the second mobile device, and
wherein the one or more motion sensors of the first mobile device and the one or more sensors of the second mobile device each include at least one of an accelerometer, a gyroscope and an altimeter.

20. The location server according to claim 13, wherein the first additional information includes a geometrical population condition associated with the first mobile device, and
wherein the second additional information includes a geometrical population condition associated with the second mobile device.

* * * * *